Patented May 30, 1939

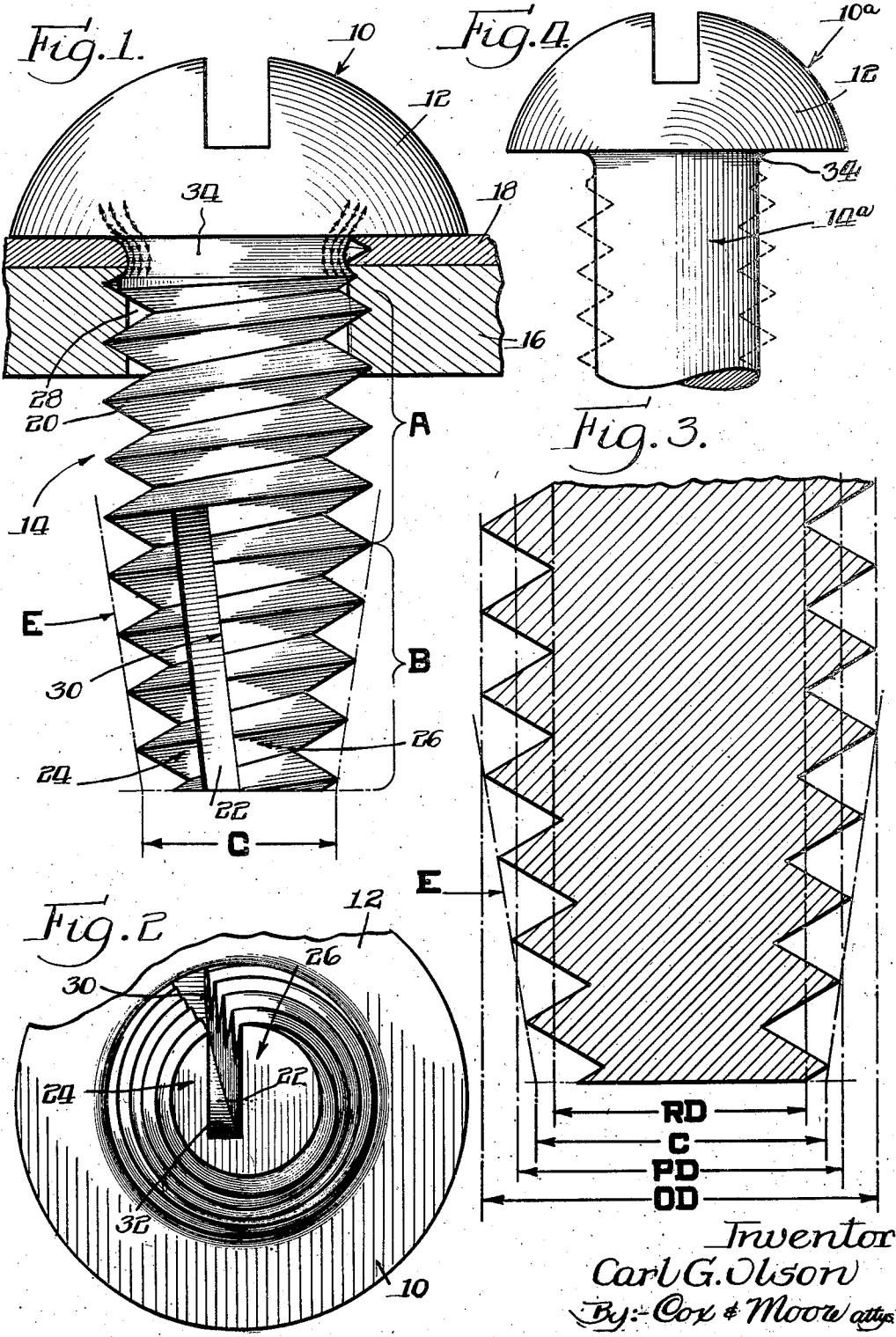

2,160,706

UNITED STATES PATENT OFFICE 2,160,706

TAPPING SCREW

Carl G. Olson, Chicago, Ill., assignor to Illinois Tool Works, Chicago, Ill., a corporation of Illinois Application September 13, 1935, Serial No. 40,464
Renewed March 23, 1938

5 Claims. (Cl. 85—41)

This invention relates generally to self-tapping screws, and more particularly to screws adapted for fastening metal.

In fastening relatively thin stock, such as sheet metal, to heavier stock by means of a self-tapping screw, in which the thread of the screw extends to the clamping surface of the head, difficulty has been experienced in drawing the sheet metal tightly against the heavier metal. This results from the fact that the thread portion of the screw extending into the thinner stock counteracts the tendency of the screw head to clamp the sheet metal against the heavier metal. In fact, it has been common practice, in using self-tapping screws, to provide a clearance hole in the sheet metal, or, in other words, to provide an aperture which is larger than the aperture in the heavy stock in which the screw is to be fastened. This clearance hole prevents engagement of the thread beneath the screw head with the sheet metal, and thus enables the sheet metal to be drawn tightly or clamped against the heavier material.

It is an object of the present invention to provide a tapping screw, in which thread interference in the vicinity of the clamping surface of the screw head is positively precluded, and to this end I propose to terminate the screw thread a short distance below the head of the screw.

It is another object of my invention to provide a self-tapping screw which may be used without the necessity of providing any clearance hole in the material, against which the head is to be clamped, and this is also accomplished by eliminating thread engagement or interference with the material against which the screw head is clamped, thus enabling the two pieces of material to be drawn and secured tightly together.

It is a further object of my invention to provide a tapping screw which will more aggressively engage the work during the initial application of the screw thereto, and to this end I propose to so position the crown of the full thread at the entering end of the screw beyond the root diameter of the holding portion of the screw.

It is a further object of the invention to provide a tapping screw, as just set forth, in which the thread at the entering end not only projects beyond the root diameter of the holding portion in readiness to aggressively engage the work, but also to provide a thread structure which is exceptionally rigid, and thus capable of effectively withstanding the strain and stresses resulting from the aggressive engagement of the thread with the work.

More specifically, my invention contemplates screws of the type referred to above, which are capable of actually cutting away material to form the thread in the work piece, or, in other words, to provide a screw which actually taps its way into the work.

The objects just referred to, as well as other objects, will be more apparent from the following detailed description when considered in connection with the accompanying drawing, wherein—

Figure 1 is a side elevational view of a screw embodying features of the invention, said screw being shown in operative association with the work;

Figure 2 is an end elevational view of the screw shown in Figure 1;

Figure 3 is an enlarged central cross sectional view of a section of the screw shown in Figure 1 to more clearly illustrate the arrangement of the thread convolutions toward the entering end of the screw fastener; and Figure 4 is a side elevational view of the upper portion of a screw blank, from which the screw of Figure 1 is rolled, the dotted lines indicating the position of the thread convolutions after the blank has been rolled between a pair of thread rolling dies.

Referring now to the various figures of the drawing wherein like numerals have been employed to designate similar parts. it will be seen that my invention contemplates the provision of a screw fastener which I have designated generally by the numeral 10. This screw fastener includes a head 12 and a threaded or screw section 14 formed integral therewith. The threaded section 14 includes a portion designated by the bracket A, which I prefer, for purposes of description, to refer to as the holding portion of the screw, because this is the portion of the screw which finally holds the screw within a work piece 16, the head 12 serving to clamp a relatively thin piece of stock or sheet metal 18 against the heavier material 16.

I have also indicated the tapping or thread forming section of the screw by the bracket B (Figure 1). I prefer to employ a screw thread 20 of a standard machine screw type. The thread convolutions on the section A have a constant root diameter and are uniform in height. The thread on the section B is also of constant height, but diminishes in diameter toward the entering end. The diameter across the full thread of the last convolution, as indicated by the letter C, is greater than the root diameter of the holding portion A of the screw, said root diameter being indicated by the letters RD (Figure 3). It will also be noted that the diameter C is less than the pitch diameter designated by the letters PD in Figure 3. In fact, the height of the first full thread convolution on the screw is substantially one-fourth the height of the full thread on the holding portion A. The outside diameter of the thread on the holding portion A is indicated by the letters OD.

To render the screw self-tapping, I provide a longitudinal slot or recess 22, which is narrow in width but of sufficient depth at the entering end of the screw to render a section of the screw, designated by the numeral 24 (Figures 1 and 2), resilient as compared with the oppositely disposed rigid section 26. Thus, when the screw is initially inserted within an unthreaded aperture 28, the section 24 slightly yields or springs inwardly toward the other section 26, thereby allowing the serrated cutting edge 30 on the section 26 to have free access to the material into which the fastener is turned. In other words, the cutting effectiveness of the serrated edge 30 is materially increased as a result of the springing of the section 24. The chip cut away as a result of the cutting action of the edge 30 is directed against the curved surface 32 in the bottom of the recess or slot 22, and thus automatically ejected to prevent clogging.

Attention is directed to a neck portion 34 provided immediately beneath the head 12. In forming the screw blank, which I have indicated generally by the numeral 10a in Figure 4, the head 12 is formed in a suitable heading machine (not shown), which upsets the free extremity of the cylindrical portion of the blank to form the head. The cylindrical portion of the blank I have designated generally by the numeral 14a. During the heading or upsetting operation, the stock is subjected to severe stresses and strains, and it is of the utmost importance that this heading operation be performed without weakening the stock at the point where the head and shank 14a join. In other words, the fibers of the steel stock, which normally extend axially of the shank 14a, should extend into the head structure 12 without introducing a fracture or weakness at the juncture of the head and shank. It will be noted that the head and shank are united through the agency of the annular neck portion 34, the peripheral surface of which, in transverse section, is curved. Thus a sharp line of juncture is avoided and the fibers of the material, which form the juncture, curve or bend in unbroken alinement, as indicated by the directional arrows in Figure 1. The diameter of the blank section 14a is substantially equal to the pitch diameter of the completed screw and, as the blank is rolled between die blocks (not shown), the peripheral portion of the stock is formed into thread convolutions indicated by the dotted lines in Figure 4. The serrations of the die blocks do not engage the above mentioned annular curved portion immediately beneath the head, and hence do not introduce any weakness of the juncture between the screw body and head. In fact, the last or upper thread convolution formed by the die merges in an annular curved form with the upper annular curved section so as to produce the neck 34. It might be stated that the peripheral surface of this neck 34 is substantially semi-circular in cross section, and that the minimum diameter of the neck is substantially equal to the pitch diameter of the screw. Thus the minimum diameter of the neck 34 is substantially equal to the diameter of the aperture 28 which is provided in the stock 16 and 18 prior to the introduction of the screw fastener.

From the foregoing it will be apparent that by providing the neck 34, which has an outer annular curved surface and which is not engaged by the serrations of the thread rolling die during the formation of the thread on the screw, a very strong juncture is established between the head and the screw body. Furthermore, by terminating the thread 20 short of the clamping surfaces of the head 12, and by having the neck 34 of a diameter which is substantially equal to the aperture of the work, the screw, when it is driven home, will effectively draw and tighten the sheet metal 18 against the surface of the heavier material 16. This is to be clearly distinguished from screw devices wherein the thread extends to and merges with the clamping surface of the screw head, the thread portion immediately adjacent the head, in such instances, forming a helical locking engagement with the sheet metal, thereby preventing the drawing and tightening of the sheet metal against the heavier stock in response to the action of the clamping surface of the head.

It will also be noted that the thread convolution toward the upper extremity of the screw section 14 decreases in diameter as it merges with the neck portion 34. In rolling the thread on the blank 14a, the thread rolling dies (not shown) are purposely formed so as to gradually merge this upper thread convolution with the neck portion 34. In fact, as previously pointed out, the rolling operation in this vicinity serves to form the lower annular curved portion of the neck 34. By gradually merging the upper thread convolution with the neck, the strength of the screw in this vicinity is materially enhanced.

It will also be apparent from the foregoing description that the effective or work engaging portion of the thread 20 at the entering end of the screw projects beyond the root diameter of the holding portion A. In this manner the screw differentiates from a structure wherein the effective portion of the thread, for example, in conventional wood screws, extends considerably below the root diameter of the cylindrical portion; furthermore, a full or complete thread is maintained over the entire extent of the screw. This full or complete thread presents a firm and rigid structure designed to more aggressively engage the stock into which it is inserted. Thus, when the cutting action of the fastener is initiated, a very firm and aggressive bite is made in the work, thereby causing the screw to more effectively pull itself into the work once it has been given a slight turn and axial thrust. It will also be noted that the diameter of the thread convolution on the screw section B decreases gradually so that, when the screw is initially inserted within the unthreaded aperture of the work, it may be easily guided. This gradual external tapering of the thread diameter is indicated by the dot-and-dash lines E (Figures 1 and 3).

In my application Serial No. 653,846, filed January 27, 1933, which was copending herewith and which has since matured into Patent No. 2,093,171, I disclosed a thread cutting screw equipped with a multiple thread of the machine screw type commonly referred to as a fine pitch thread. In the present application I have shown a screw having a standard, conventional machine screw thread which is commonly referred to as a coarse pitch machine screw thread. The present invention, therefore, comprehends the production of thread forming screws in which a conventional machine screw thread is employed so as to enable repair or replacement to be accomplished by the use of common machine screws of the usual coarse pitch standard. While claims in my aforesaid patent have been drawn to cover both fine and coarse pitch threads, certain claims presented herein are more specifically directed to screws in which the thread conforms substantially with standard machine screw threads normally employed on a screw of the size shown herein.

For purposes of disclosure, I have shown and described a V thread, in which the top and bottom present a helical edge or line. Obviously the term "V-shaped" has been used advisedly in the specification and claims in its broadest sense to include all of the standard V type machine screw threads, whether or not the bottom and top of the thread terminate in a helical line or slight flat, corresponding with existing standards for machine screws, as shown in standard handbooks.

Having thus described my invention, what I claim as new and desire to secure by Letters Patent is:

1. A tapping screw fastener including an elongated body having a threaded cylindrical holding portion and a hardened threaded tapping portion at one extremity thereof, a head connected with the opposite extremity of said body, the thread on the tapping portion decreasing in external diameter toward the entering end to facilitate its initial application to an unthreaded aperture in a work piece, and a neck portion extending between said head and the first thread convolution on the holding portion, being of concave configuration and curving outwardly in merging with the underside of said head, whereby to counteract the tendency of fracture in this vicinity when the screw is applied to the work.

2. A thread forming screw fastener including an elongated body having a threaded cylindrical holding portion and a hardened threaded thread forming portion at one extremity thereof, a head connected with the opposite extremity of said body, the thread on the thread forming portion decreasing in external diameter toward the entering end to facilitate its initial application to an unthreaded aperture in a work piece, said thread having a relatively sharp crown to facilitate digging into the work when the screw is turned therein, and a threadless neck portion extending from the underside of the head to the first thread convolution, the upper portion of the thread being incomplete and progressively decreasing in outer diameter and merging with said threadless neck portion, said threadless neck portion being concave and relatively narrow.

3. A thread cutting screw fastener including an elongated body having a threaded holding portion and a hardened, non-burrowing threaded tapping portion at one extremity thereof, and a head at the opposite extremity of said body, the thread along the holding and tapping portions being V-shaped in cross-section and extending from the vicinity of the head toward the entering end of the fastener, the thread on the tapping portion decreasing in external and root diameter toward the entering end to facilitate its initial application to an unthreaded aperture in a work piece and transversely recessed so as to present a serrated cutting edge, the effective portion of said cutting edge terminating short of the head, said thread along the holding and tapping portions having a uniform crown cross-section conforming with the conventional coarse pitch machine screw thread, the distance between the last thread convolution on the holding portion and the underside of the head being no greater than the axial pitch of the thread on said holding portion.

4. A thread cutting screw fastener including an elongated body having a threaded holding portion and a hardened, non-burrowing threaded tapping portion at one extremity thereof, and a head at the opposite extremity of said body, the thread extending from the vicinity of the head toward the entering end of the fastener, the thread on the tapping portion decreasing in external and root diameters toward the entering end to facilitate its initial application to an unthreaded aperture in a work piece and transversely recessed so as to present a serrated cutting edge, the effective portion of said cutting edge terminating short of the head, the thread helices on the holding portion presenting ridges of substantially uniform V-shaped cross-sectional contour and the thread helices on the tapping portion presenting ridges of V-shaped cross-section, the included angle of which is not greater than the included angle of the V-shaped ridges on the holding portion, said thread on the holding portion conforming in cross-sectional contour with the conventional coarse pitch machine screw thread, the distance between the last thread convolution on the holding portion and the underside of the head being no greater than the axial pitch of the thread on said holding portion.

5. A thread cutting screw fastener including an elongated body having a threaded holding portion and a hardened, non-burrowing threaded tapping portion at one extremity thereof, and a head at the opposite extremity of said body, the thread extending from the vicinity of the head toward the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, said thread along the holding and tapping portions being substantially uniform in height and conforming in cross-sectional contour with the conventional coarse pitch machine screw thread, the distance between the last thread convolution on the holding portion and the underside of the head being no greater than the axial pitch of the thread on said holding portion.

CARL G. OLSON.